United States Patent
Miyano et al.

(10) Patent No.: US 8,126,257 B2
(45) Date of Patent: Feb. 28, 2012

(54) ALIGNMENT OF SEMICONDUCTOR WAFER PATTERNS BY CORRESPONDING EDGE GROUPS

(75) Inventors: Yumiko Miyano, Tokyo (JP); Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1077 days.

(21) Appl. No.: 11/783,729

(22) Filed: Apr. 11, 2007

(65) Prior Publication Data

US 2007/0280541 A1 Dec. 6, 2007

(30) Foreign Application Priority Data

Apr. 12, 2006 (JP) ................................. 2006-110120

(51) Int. Cl.
*G06K 9/00* (2006.01)
(52) U.S. Cl. ....................... 382/145; 382/294
(58) Field of Classification Search .................. None
See application file for complete search history.

(56) References Cited

U.S. PATENT DOCUMENTS

| | | | |
|---|---|---|---|
| 4,791,586 A * | 12/1988 | Maeda et al. ...................... 716/5 |
| 5,696,835 A * | 12/1997 | Hennessey et al. ............ 382/141 |
| 5,974,169 A * | 10/1999 | Bachelder ..................... 382/151 |
| 6,614,923 B1 | 9/2003 | Shishido et al. | |
| 6,865,288 B1 | 3/2005 | Shishido et al. | |
| 6,870,951 B2 * | 3/2005 | Cai ................ 382/149 |
| 7,693,348 B2 * | 4/2010 | Zavadsky et al. ............. 382/294 |
| 2005/0078881 A1 * | 4/2005 | Xu et al. ....................... 382/294 |
| 2006/0262977 A1 * | 11/2006 | Mitsui ........................ 382/209 |
| 2007/0098249 A1 * | 5/2007 | Miyano et al. ............... 382/145 |
| 2008/0056558 A1 * | 3/2008 | Mitsui .......................... 382/144 |

FOREIGN PATENT DOCUMENTS

| JP | 2003-178314 | 6/2003 |
| JP | 2005-098885 | 4/2005 |

* cited by examiner

*Primary Examiner* — Brian Werner
*Assistant Examiner* — Barry Drennan
(74) *Attorney, Agent, or Firm* — Finnegan, Henderson, Farabow, Garrett & Dunner, L.L.P.

(57) ABSTRACT

A pattern shape evaluation method includes acquiring an image of an evaluation target pattern including a plurality of element patterns; detecting edge of the evaluation target pattern from the image; classifying the detected edge of the evaluation target pattern into a plurality of evaluation target pattern edge groups; acquiring edge of a reference pattern serving as an evaluation standard for the element patterns; classifying the edge of the reference pattern into a plurality of reference pattern edge groups; selecting a reference pattern edge group to be aligned with the edge of the evaluation target pattern from the classified reference pattern edge groups; aligning the edge of the selected reference pattern edge group with the edge of the evaluation target pattern; and evaluating the shape of the evaluation target pattern by use of the result of the alignment.

14 Claims, 13 Drawing Sheets

ALIGNMENT OF SEMICONDUCTOR WAFER PATTERNS BY CORRESPONDING EDGE GROUPS

CROSS REFERENCE TO RELATED APPLICATION

This application claims benefit of priority under 35 USC §119 to Japanese patent application No. 2006-110120, filed on Apr. 12, 2006, the contents of which are incorporated by reference herein.

BACKGROUND OF THE INVENTION

1. Field of the Invention

The present invention relates to a pattern shape evaluation apparatus, a pattern shape evaluation method, a semiconductor device manufacturing method, and a program.

2. Related Background Art

Heretofore, in evaluating a pattern of a semiconductor device, an image of the pattern is acquired, the width of the pattern is measured at an arbitrary place from the obtained image, and the width is compared with a preset specification. However, when the shape of the pattern is complicated, it is impossible to know a change in the whole shape of the pattern if the dimensional measurement is carried out at one place alone. The number of measurement points has to be increased to know the overall change, but this decreases the throughput of the measurement.

In order to solve the above-mentioned problem, there have been proposed various methods for comparing the shape of a pattern with data serving as an evaluation standard. These proposals include a pattern shape evaluation method which comprises: acquiring an image of an actual pattern which is an evaluation target by, for example, a scanning electron microscope (SEM); and acquiring the edge of the evaluation target pattern from the acquired image; superposing this edge on, for example, design data or lithography simulation data for the pattern.

For example, there is a method which comprises: aligning the edge of an evaluation pattern with design data before measuring the distance of a difference therebetween, and evaluating how faithfully to the design data the actual pattern is formed, thereby judging whether the sample is good or bad, and there is also a method which compares the edge of an actual pattern with a lithography simulation result to verify the accuracy of a simulation model. There is another method which comprises: providing in advance an allowable range (tolerance data) in design data; aligning the edge of an evaluation target pattern with the tolerance data to check whether the edge of the evaluation pattern is within the allowable range, thereby judging whether the evaluation target pattern is good or bad. In any of these evaluation methods, the accuracy of aligning (matching) the evaluation target pattern with a reference pattern greatly influences the evaluation.

However, the shape of a pattern on an actual wafer is often distorted with respect to design data, and this cause difficulty in the alignment. Moreover, the degree of the distortion is not uniform among a plurality of patterns present in an acquired image, and unpredictable distortions are also found. For example, there is a case where the position of only one at the end of a plurality of line patterns arranged in parallel to each other has moved from the design data due to, for example, the influence of etching or an aberration of an exposure unit. If such an actual pattern is to be superposed on the design data, a situation arises where matching suitable for evaluation can not be achieved due to the influence of the moved actual pattern. If the distance of a difference between the design data and the evaluation pattern is measured in such a case, an actual change of the shape to which a positional difference in matching is added is calculated as the distance of the difference.

Here, it is possible to provide in advance an evaluation region (region of interest: hereinafter simply referred to as "ROI".) to prevent the inclusion of a pattern which has produced a positional difference so that matching is carried out only within this ROI. However, when the amount of the positional difference has changed due to a change of process conditions, questionable patterns may be contained in an assumed ROI. Moreover, in the case of a pattern having a complicated shape instead of the above-mentioned simple line pattern, it is not possible for a rectangular ROI to deal with such a pattern, and a problem arises in which the setting of the ROI itself becomes troublesome.

SUMMARY OF THE INVENTION

According to a first aspect of the present invention, there is provided a pattern shape evaluation method comprising:

acquiring an image of an evaluation target pattern including a plurality of element patterns;

detecting edge of the evaluation target pattern from the image;

classifying the detected edge of the evaluation target pattern into a plurality of evaluation target pattern edge groups;

acquiring edge of a reference pattern serving as an evaluation standard for the element patterns;

classifying the edge of the reference pattern into a plurality of reference pattern edge groups;

selecting a reference pattern edge group to be aligned with the edge of the evaluation target pattern from the classified reference pattern edge groups;

aligning the edge of the selected reference pattern edge group with the edge of the evaluation target pattern; and evaluating the shape of the evaluation target pattern by use of the result of the alignment.

According to a second aspect of the present invention, there is provided a program which is stored in a computer-readable medium and which causes a computer to execute a pattern shape evaluation method, the pattern shape evaluation method comprising:

acquiring an image of an evaluation target pattern including a plurality of element patterns;

detecting edge of the evaluation target pattern from the image;

classifying the detected edge of the evaluation target pattern into a plurality of evaluation target pattern edge groups;

acquiring edge of a reference pattern serving as an evaluation standard for the element patterns;

classifying the edge of the reference pattern into a plurality of reference pattern edge groups;

selecting a reference pattern edge group to be aligned with the edge of the evaluation target pattern from the classified reference pattern edge groups;

aligning the edge of the selected reference pattern edge group with the edge of the evaluation target pattern; and evaluating the shape of the evaluation target pattern by use of the result of the alignment.

According to a third aspect of the present invention, there is provided a semiconductor device manufacturing method comprising executing a process of manufacturing a semiconductor device on a substrate when a pattern to be inspected formed on the substrate for a semiconductor device is judged to satisfy required specifications of the semiconductor device as a result of an evaluation by a pattern shape evaluation method, the pattern shape evaluation method including:

acquiring an image of an evaluation target pattern including a plurality of element patterns;

detecting edge of the evaluation target pattern from the image;

classifying the detected edge of the evaluation target pattern into a plurality of evaluation target pattern edge groups;

acquiring edge of a reference pattern serving as an evaluation standard for the element patterns;

classifying the edge of the reference pattern into a plurality of reference pattern edge groups;

selecting a reference pattern edge group to be aligned with the edge of the evaluation target pattern from the classified reference pattern edge groups;

aligning the edge of the selected reference pattern edge group with the edge of the evaluation target pattern; and evaluating the shape of the evaluation target pattern by use of the result of the alignment.

According to a fourth aspect of the present invention, there is provided a pattern shape evaluation apparatus comprising:

an edge detecting unit which is provided with an image of an evaluation target pattern including a plurality of element patterns to detect the edge of the evaluation target pattern from the image;

an edge labeling unit which classifies the edge of the detected evaluation target pattern into a plurality of evaluation target pattern edge groups;

a design data labeling unit which is provided with data on the edge of a reference pattern serving as an evaluation standard for the element patterns and which classifies the edge of the reference pattern into a plurality of reference pattern edge groups;

a selecting unit which selects a reference pattern edge group to be aligned with the edge of the evaluation target pattern from the classified reference pattern edge groups;

an alignment unit which aligns the edge of the selected reference pattern edge group with the edge of the evaluation target pattern; and a pattern shape evaluation unit which evaluates the shape of the evaluation target pattern by use of the result of the alignment.

DETAILED DESCRIPTION OF THE INVENTION

Several embodiments of the present invention will hereinafter be described with reference to the drawings.

(1) One Embodiment of Pattern Shape Evaluation Apparatus

Figure 1:
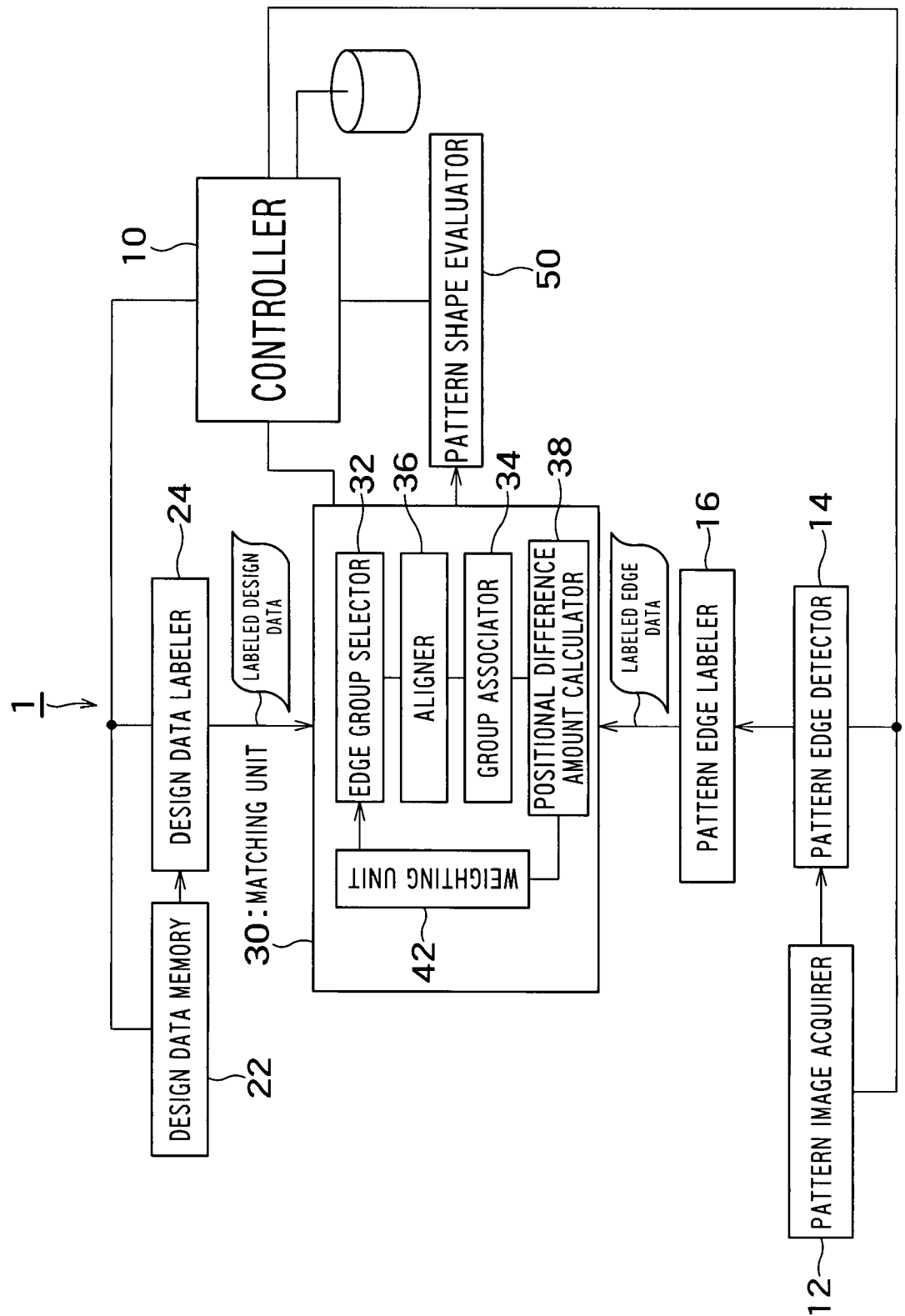
FIG. 1 is a block diagram showing a schematic configuration of a pattern shape evaluation apparatus in one embodiment according to the present invention.

FIG. 1 is a block diagram showing a schematic configuration of a pattern shape evaluation apparatus in one embodiment according to the present invention. A pattern shape evaluation apparatus 1 shown in FIG. 1 comprises a controller 10, a memory MR1, a pattern image acquirer 12, a pattern edge detector 14, a pattern edge labeler 16, a design data memory 22, a design data labeler 24, a matching unit 30 and a pattern shape evaluator 50.

The memory MR1 is connected to the controller 10, and stores a program in which there is written an inspection recipe for executing a pattern shape evaluation method according to the present invention described later.

The controller 10 is not only connected to the memory MR1, but also connected to the pattern image acquirer 12, the pattern edge detector 14, the pattern edge labeler 16, the design data memory 22, the design data labeler 24, the matching unit 30 and the pattern shape evaluator 50. The controller 10 generates control signals and supplies the control signals to the respective sections to control the entire apparatus, and reads the program of the inspection recipe from the memory MR1, thereby executing inspection procedures on the basis of the program.

The pattern image acquirer 12 is not only connected to the pattern edge detector 14 but also connected to an unshown SEM unit and an optical imagining unit, and acquires, from these units, an image of an evaluation target pattern such as an SEM image or an optical microscopic image, and then supplies this image to the pattern edge detector 14. The pattern edge detector 14 is connected to the pattern edge labeler 16, and detects the edge of the evaluation target pattern from the image supplied from the pattern image acquirer 12, and then supplies the edge to the pattern edge labeler 16. The pattern edge labeler 16 is connected to the matching unit 30, and classifies (labels) the edge of the evaluation target pattern into evaluation target pattern edge groups and supplies the result of grouping to the matching unit 30.

The design data memory 22 stores design data for the evaluation target pattern. The design data labeler 24 is connected to the design data memory 22 and the matching unit 30. The design data labeler 24 takes the design data out of the design data memory 22, develops a linear image to generate a reference pattern, classifies (labels) the edge thereof into reference pattern edge groups, and supplies the result of grouping to the matching unit 30.

The matching unit 30 includes an edge group selector 32, a group associator 34, an aligner 36, a positional difference amount calculator 38 and a weighting unit 42, and is connected to the pattern shape evaluator 50. The edge group selector 32 selects edge groups to be aligned among the reference pattern edge groups. The aligner 36 aligns the reference pattern edge groups with the evaluation target pattern so that they are brought into proximity to each other, thereby aligning the selected reference pattern with the evaluation target pattern. The positional difference amount calculator 38 calculates, as the amount of a positional difference, a difference between standard coordinates of the image of the reference pattern and standard coordinates of the image of the evaluation target pattern, at the time of the alignment by the aligner 36. The weighting unit 42 is provided with the result of calculating the positional difference amount from the aligner 36, and weights each of the reference pattern edge groups in accordance with the degree of the positional difference amount. The group associator 34 uses the result of the alignment to associate the evaluation target pattern edge groups with the reference pattern edge groups, and supplies the result of the association to the pattern shape evaluator 50. From the result of the association supplied from the matching unit 30, the pattern shape evaluator 50 compares the evaluation target pattern with the reference pattern, thereby evaluating the shape of the evaluation target pattern.

The operation of the pattern shape evaluation apparatus 1 shown in FIG. 1 will be described as an embodiment of the pattern shape evaluation method according to the present invention.

(2) First Embodiment of Pattern Shape Evaluation Method

Figure 2:
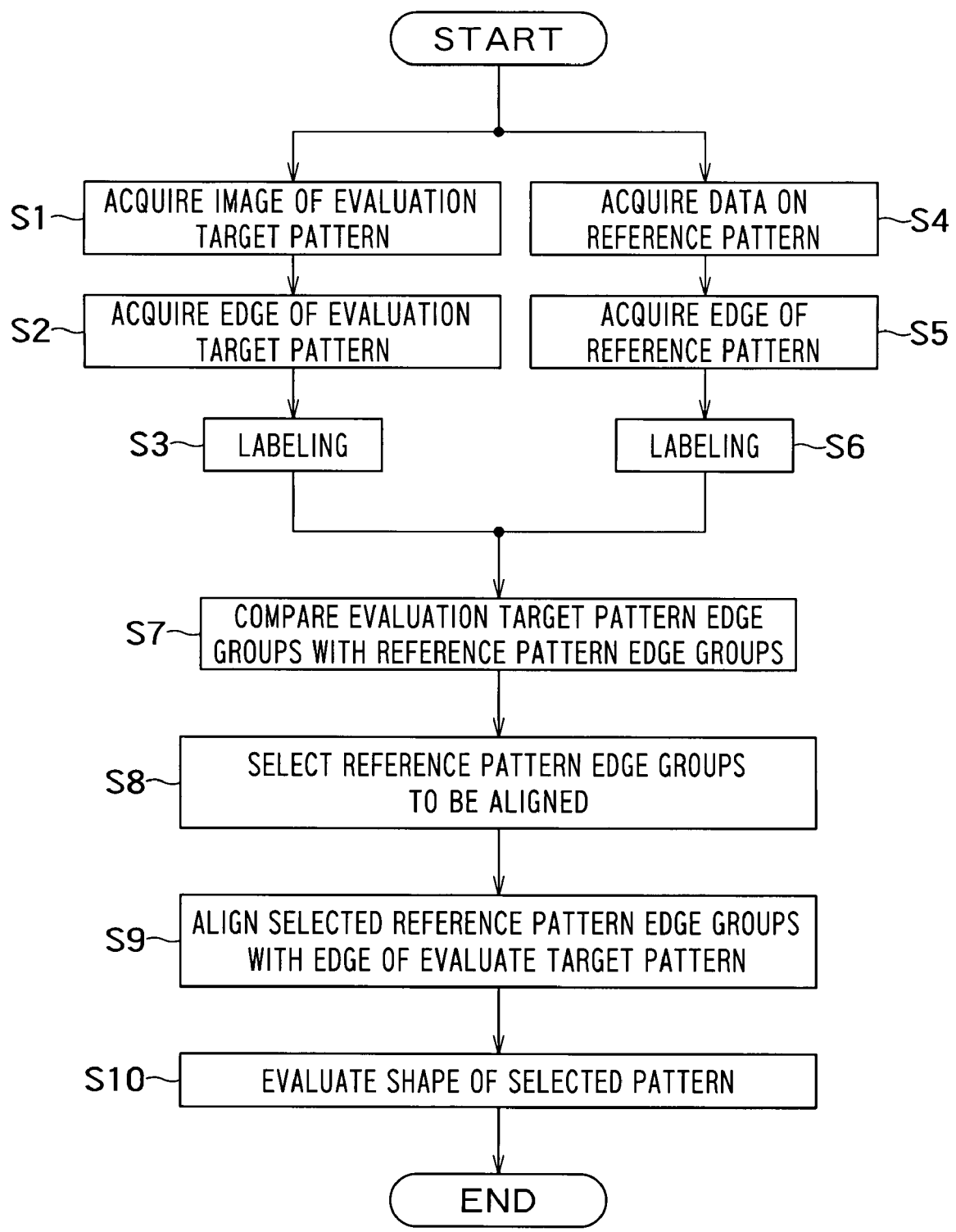
FIG. 2 is a flowchart showing a schematic procedure of a pattern shape evaluation method in a first embodiment according to the present invention.

FIG. 2 is a flowchart showing a schematic procedure of a pattern shape evaluation method according to the present embodiment. It is to be noted that a case will hereinafter be taken as an example where the shape of a pattern is evaluated using an SEM image acquired by an SEM unit, but the present invention is not limited thereto and can be applied an image acquired by any other unit such as an optical image acquiring unit. However, the use of the SEM image is preferable at the present moment because it is necessary to acquire an image of a pattern with higher magnification in order to evaluate the shape of a micropattern of a semiconductor.

Figure 3:
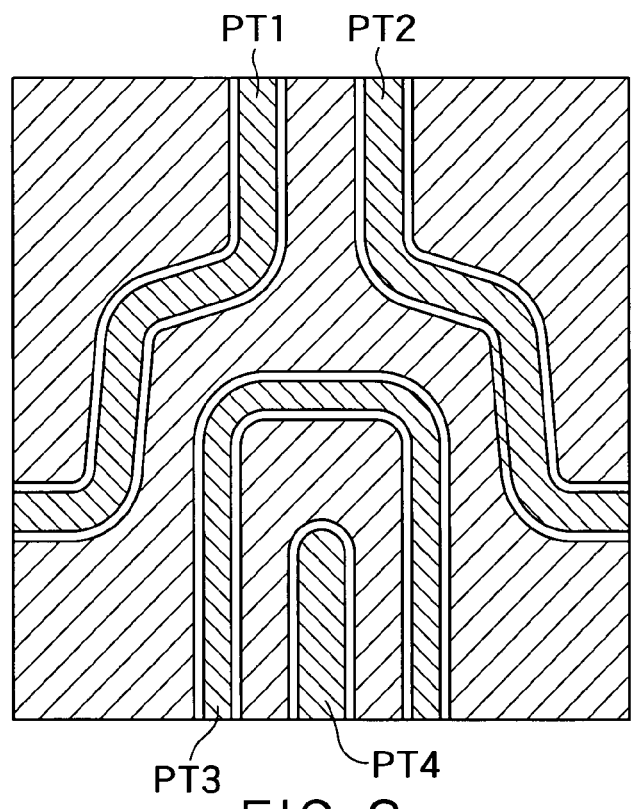
FIG. 3 is a schematic diagram showing one example of an observation image of an evaluation target pattern.

First, a sample in which an evaluation target pattern is formed is brought in the SEM unit, and an image of the pattern is acquired (step S1) and supplied to the pattern image acquirer 12. Thus, for example, an observation image as shown in FIG. 3 is obtained. As shown in FIG. 3, four kinds of patterns TP1 to TP4 are present in the observation image. In the present embodiment, the four kinds of patterns TP1 to TP4 shown in the observation image correspond to, for example, element patterns. In addition, the edges of the patterns are shining white because emission efficiency of a secondary electron increases at the edges of the patterns.

Next, the pattern edge detector 14 detects an edge corresponding to the contour of the evaluation target pattern from data on the acquired image (FIG. 2, step S2). Since the edge of the evaluation target pattern is shining white in the observation image as described above, the edge can be extracted using binarization by a threshold value of intensity in the simplest method. However, any other method may be used such as a method using a sobel filter, a method using a canny filter, a method by template matching (Japanese Patent Publication Laid-open No. 2003-178314), a method in which a threshold for data is determined on the basis of intensities of signals in the vicinity of the edge of a pattern to extract an edge (threshold value method), and a linear approximation method. By the above citation, the contents of Japanese Patent Publication Laid-open No. 2003-178314 are incorporated in the specification of the present application. One example of edge data obtained as described above is shown in an inspection image GT2 in FIG. 4.

Subsequently, the pattern edge labeler 16 labels the obtained edge after grouping (FIG. 2, step S3). In the present embodiment, the edge is divided into four groups forming element patterns, which are labeled as "α", "β", "γ" and "δ".

Figure 5:
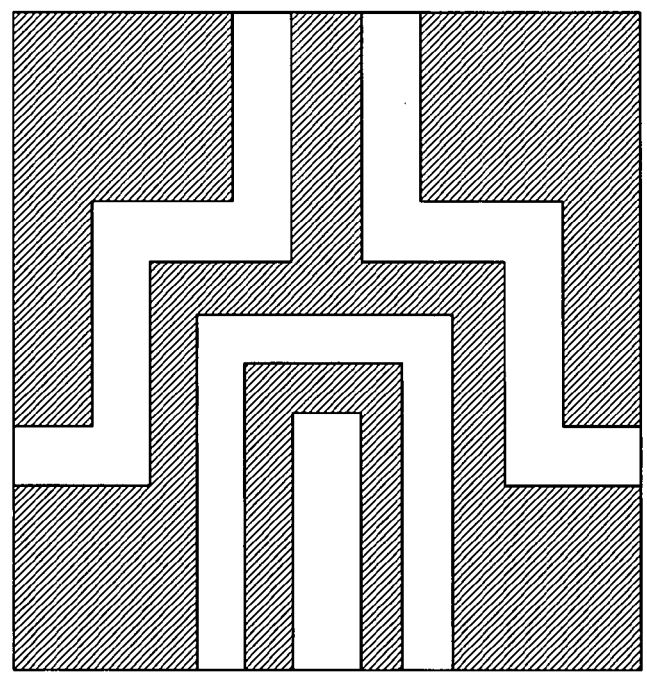
FIG. 5 is a diagram showing design data for the evaluation target pattern shown in FIG. 3.

On the other hand, the design data labeler 24 carries out data acquisition (FIG. 2, step S4), edge acquisition (step S5) and labeling (step S6) for the reference data as well almost simultaneously with or in parallel with the procedure in steps S1 to S3. An example is shown in FIG. 5 in which there is developed, in a diagrammatic view, design data which corresponds to that for the evaluation target pattern shown in FIG. 3 and which is stored in the memory 22. In a reference image GR2 in FIG. 6, there is shown one example of the result of acquiring edge data corresponding to the edge of the reference pattern from the image data in FIG. 5 (step S5), and grouping and labeling the edge (step S6). In the example shown in FIG. 6, the edge is divided into four reference pattern edge groups forming element patterns as in the evaluation target pattern, which are labeled as "a", "b", "c" and "d".

Next, the edge group selector 32 compares the evaluation target pattern edge groups with the reference pattern edge groups (step S7), and selects reference pattern edge groups to be aligned with the evaluation target pattern edge groups among the reference pattern edge groups (step S8). In the present embodiment, in accordance with the purpose of the shape evaluation and required specifications of a product, an operator makes a selection and issues an instruction to the edge group selector 32. Here, a reference pattern edge group is excluded which is considered to have a high risk of decreasing the accuracy of alignment due to a larger positional difference and a higher degree of a shape change than those of the other element patterns as a result of the comparison between the evaluation target pattern edge groups and the reference pattern edge groups, such that the reference pattern edge groups to be aligned are selected. In the case of a comparison between the example shown in FIG. 4 and the example shown in FIG. 6, the three reference pattern edge groups "a", "b" and "c" are to be aligned which remain after the exclusion of the reference pattern edge group "d" having a high degree of the shape change as shown in FIG. 7.

Figure 8:
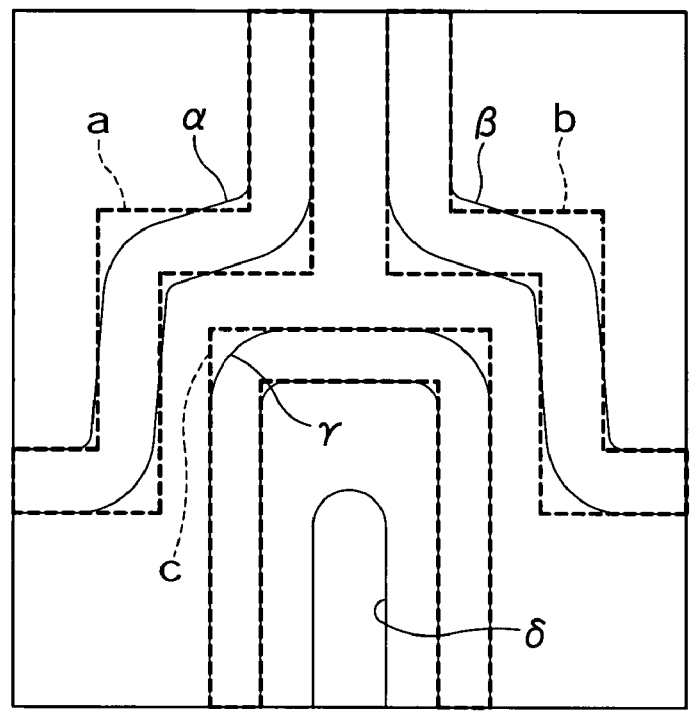
FIG. 8 is a diagram showing one example of the result of aligning the selected reference pattern edge groups with the edge of the evaluation target pattern.

Subsequently, the aligner 36 aligns the selected reference pattern edge groups "a", "b" and "c" with the edge groups of the evaluation target pattern so that their edges are superposed on each other as much as possible (step S9). In the present embodiment, as a method of matching, it is desirable to use, for example, a method proposed in Japanese patent laid open (kokai) 2005-098885 which uses the distance between the edges. By this citation, the contents of the specification of the above-mentioned application are incorporated in the present application. However, other methods may be used as long as such methods allow the superposition with accuracy. One example of the result of such alignment is shown in FIG. 8. Then, the group associator 34 associates the evaluation target pattern edge groups with the reference pattern edge groups using the result of the alignment in the procedure described above. In the example shown in FIG. 8, "a" is associated with "α", "b" is associated with "β", and "c" is associated with "γ".

Next, the result of the association is sent from the group associator 34 to the pattern shape evaluator 50, and the pattern shape evaluator 50 compares the reference pattern selected for alignment with the corresponding evaluation target pattern, thereby evaluating the shape of the evaluation target pattern (step S10).

Figure 4:
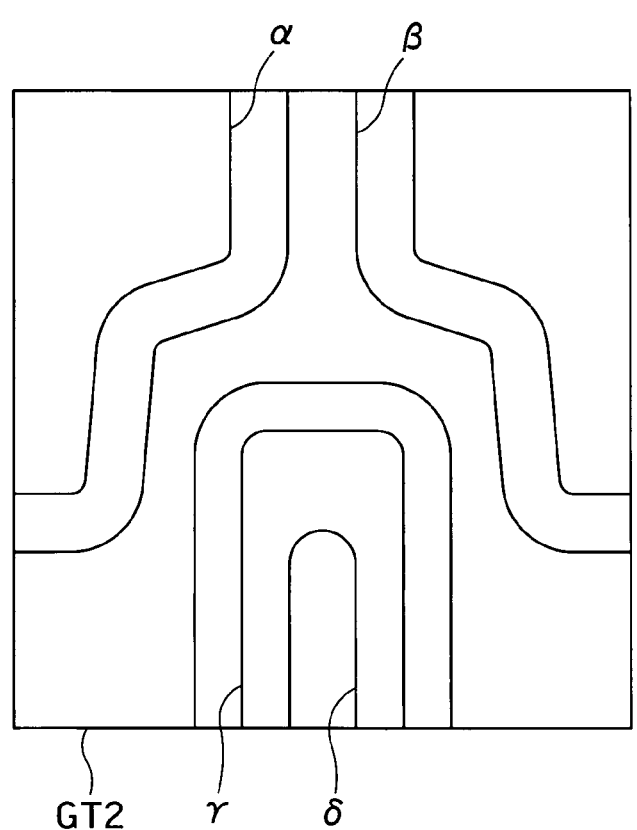
FIG. 4 is a diagram showing one example of edge data for the evaluation target pattern detected from the observation image shown in FIG. 3.
Figure 9:
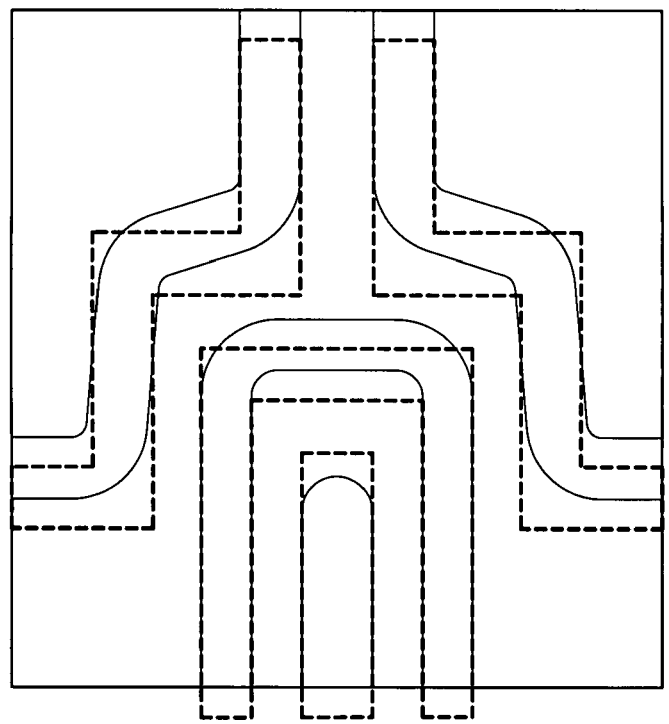
FIG. 9 is a diagram showing one example of the result of aligning according to a prior art.

Thus, according to the present embodiment, attention is focused on a part of the pattern of the reference data in order to exclude the influence of a pattern (the element pattern labeled as the edge group "δ" in the example shown in FIG. 4) in which the degree of the shape change is higher than those of the other patterns, such that it is possible to highly accurately align the reference pattern with the evaluation target pattern. In FIG. 9, there is shown one example of the result of aligning the evaluation target pattern of the present embodiment with the reference pattern according to a prior art. As shown in FIG. 9, the accuracy of alignment has heretofore been extremely low because the alignment of the evaluation target pattern with the reference pattern is carried out for all the element patterns without narrowing down the reference patterns in accordance with the difference in the degree of the shape change. As apparent from a comparison between FIG. 9 and FIG. 8, it is possible to evaluate the pattern shape with high accuracy according to the present embodiment because the alignment can be carried out with high accuracy.

Figure 6:
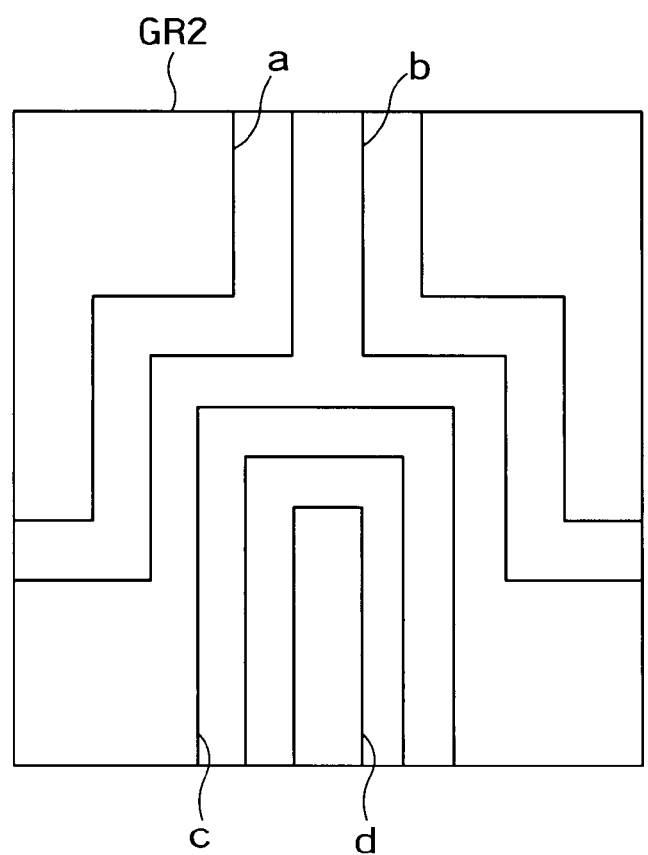
FIG. 6 is a diagram showing one example of the result of grouping and labeling the edge of a reference pattern.
Figure 7:
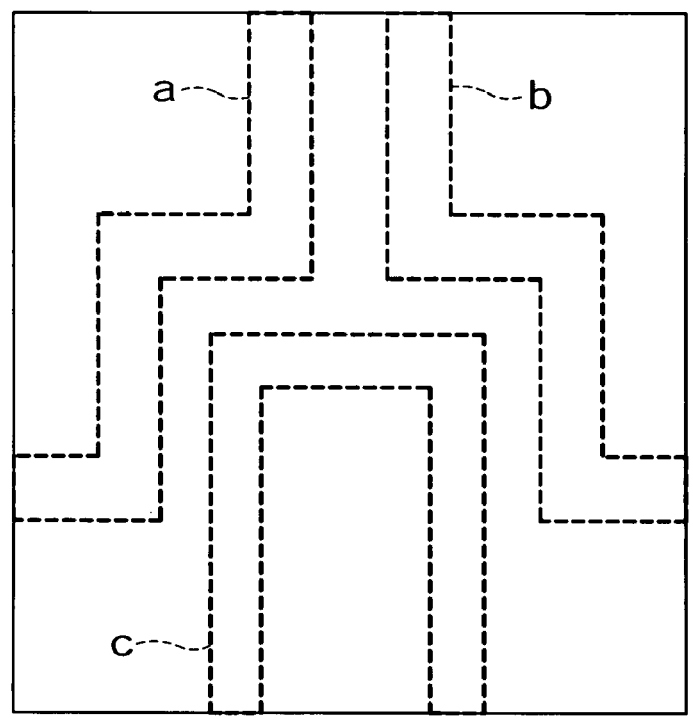
FIG. 7 is a diagram showing reference pattern edge groups selected for alignment.
Figure 10:
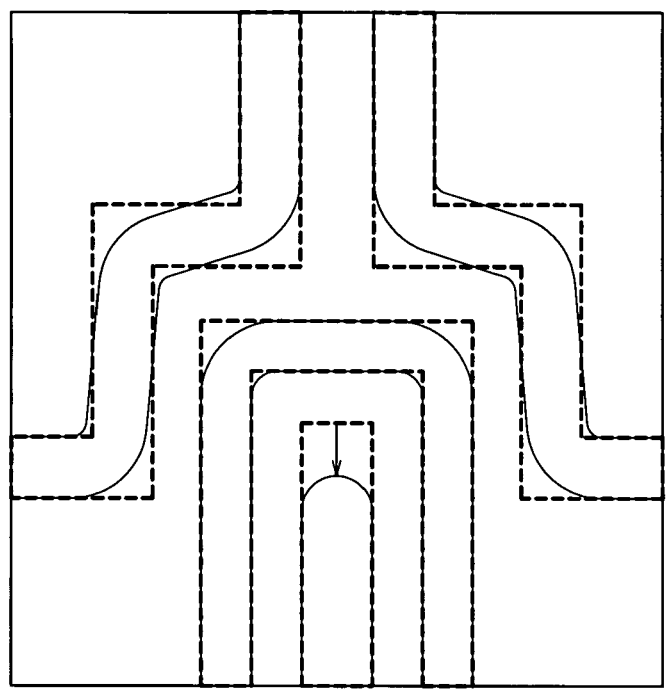
FIG. 10 is a diagram explaining a modification of the first embodiment of the pattern shape evaluation method according to the present invention.
Figure 11:
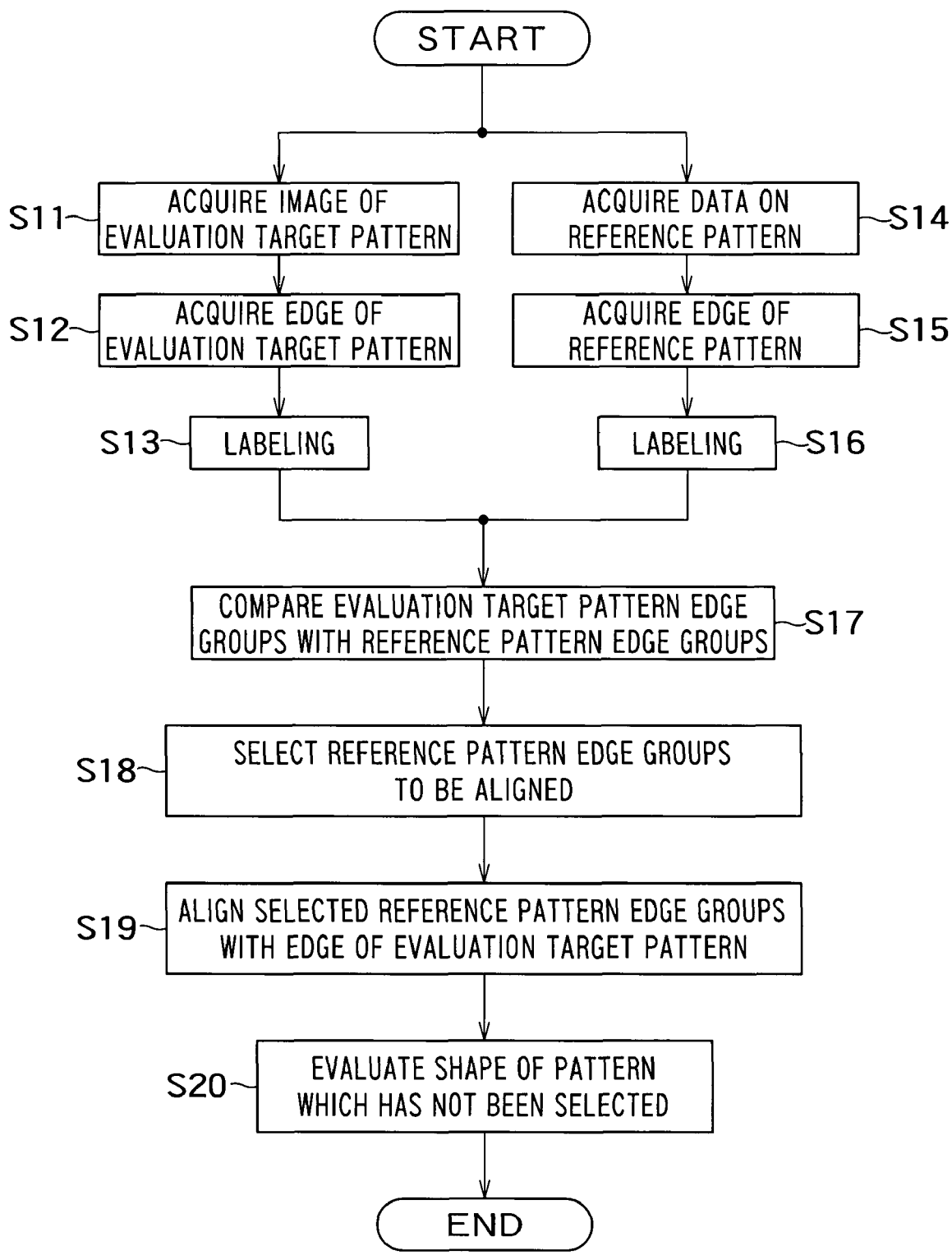
FIG. 11 is a flowchart showing a schematic procedure of the pattern shape evaluation method shown in the modification in FIG. 10.

In the embodiment described above, a form has been shown in which the shape evaluation is implemented for the reference pattern edge groups "a", "b" and "c" other than the excluded reference pattern edge group "d" in FIG. 6. However, as shown in FIG. 10, the alignment may be carried out only using the reference pattern edge groups "a", "b" and "c", and then the reference pattern edge group "d" excluded during the alignment may be compared with the evaluation target pattern edge group "δ" to evaluate the shape of the evaluation target pattern edge group "δ". The procedure of such a modification is shown in a flowchart of FIG. 11. The substantial difference between the procedure shown in FIG. 11 and the procedure in FIG. 2 only lies in the last step S20, and for other steps, 10 is added to the numbers of the steps in the procedure in FIG. 2, so that these steps are substantially the same as those in the procedure in FIG. 2.

(3) Second Embodiment of Pattern Shape Evaluation Method

While the operator specifies the reference pattern edge group used in the alignment in the embodiment described above, the present embodiment provides a method comprising calculating the amount of the positional difference of edge groups corresponding to each other between the reference pattern and the evaluation target pattern, and using the obtained positional difference amount to automatically specify a pattern.

Here, the definition of the "positional difference amount" is clarified. The positional difference amount is the amount indicating a difference between a standard point of the image of the evaluation target and a standard point of the standard image (reference image), and is expressed by, for example, horizontal and vertical distances between the standard points.

Figures 12A, 12B, 12C:
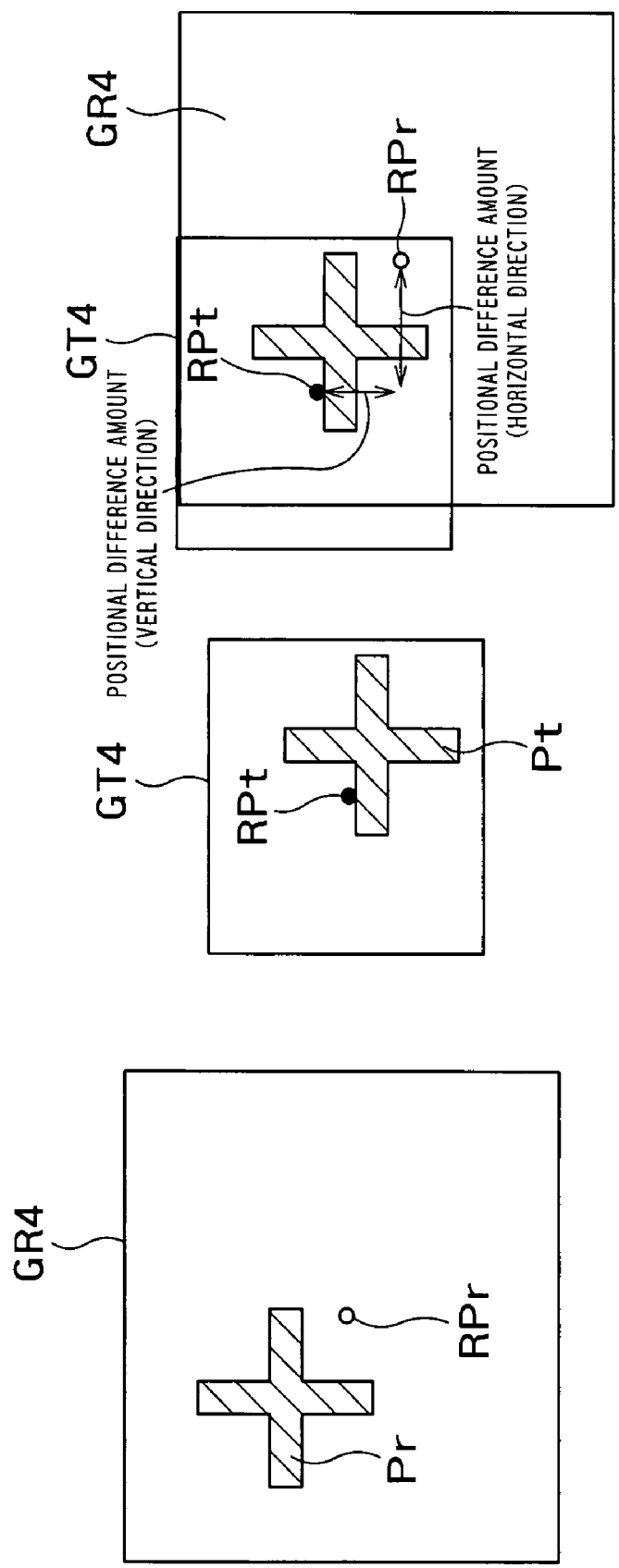
FIGS. 12A to 12C are explanatory diagrams for a "positional difference amount"

To explain more specifically using FIGS. 12A to 12C, when the evaluation target pattern is a cross pattern, a standard point RPt of an evaluation image GT4 incorporating the evaluation target pattern and a standard point RPr of a reference image GR4 which is an image of the reference pattern for providing a standard for the shape evaluation of the evaluation target pattern are located in the center of the images. A reference pattern Pr is disproportionately located in an upper left direction of the drawing with respect to the standard point RPr within the reference image GR4 in FIG. 12A, while an evaluation target pattern Pt is disproportionately located in a lower right direction of the drawing with respect to the standard point RPt within the evaluation image GT4 in FIG. 12B. In this case, when the alignment is carried out so that the evaluation target pattern Pt is superposed on the reference pattern Pr, a difference is produced between the standard points RPt and RPr with no correspondence therebetween, as shown in FIG. 12C. The positional difference amount quantitatively expresses this difference, which can be expressed by, for example, horizontal and vertical distances between these standard points RPt and RPr. In the pattern shape evaluation apparatus 1 shown in FIG. 1, the positional difference amount calculator 38 included in the matching unit 30 calculates, as the positional difference amount, a difference ($\Delta x$, $\Delta y$) between standard coordinates of the image of the reference pattern and standard coordinates of the image of the evaluation target pattern, during the alignment by the aligner 36. It is to be noted that the images, for example, the reference image GR4 in FIG. 12A and the evaluation image GT4 in FIG. 12B do not need to be the same in size (field of view) in calculating the positional difference amounts.

Figure 13:
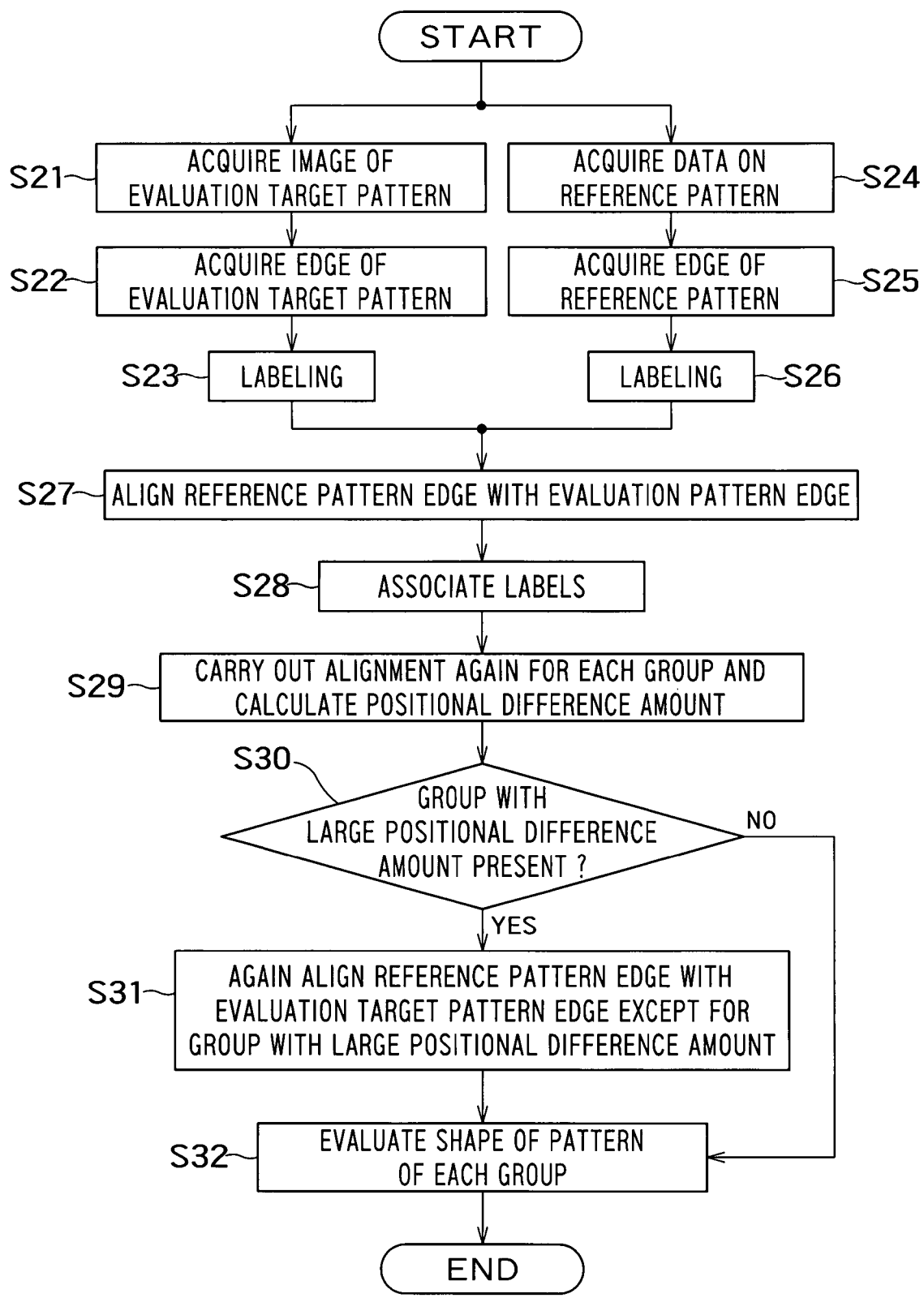
FIG. 13 is a flowchart showing a schematic procedure of a pattern shape evaluation method in a second embodiment according to the present invention.

FIG. 13 is a flowchart showing a schematic procedure of a pattern shape evaluation method in the present embodiment.

In the procedure of FIG. 13, for steps from step S21 of acquiring an image of the evaluation target pattern to step S26 of labeling the reference pattern, 20 is simply added to the numbers of steps S1 to S6 in the procedure in FIG. 2, so that the procedure in these steps is substantially the same as the procedure in steps S1 to S6, and explanation below starts in step S27.

The aligner 36 of the matching unit 30 aligns the labeled edge of the evaluation target pattern with the labeled edge of the reference pattern (step S27). Then, the group associator 34 associates the edge groups with each other using the result of this alignment (step S28). To explain using the examples in FIGS. 3 to 6 as is, "a" is associated with "α", "b" is associated with "β", "c" is associated with "γ", and "d" is associated with "δ".

Figure 14:
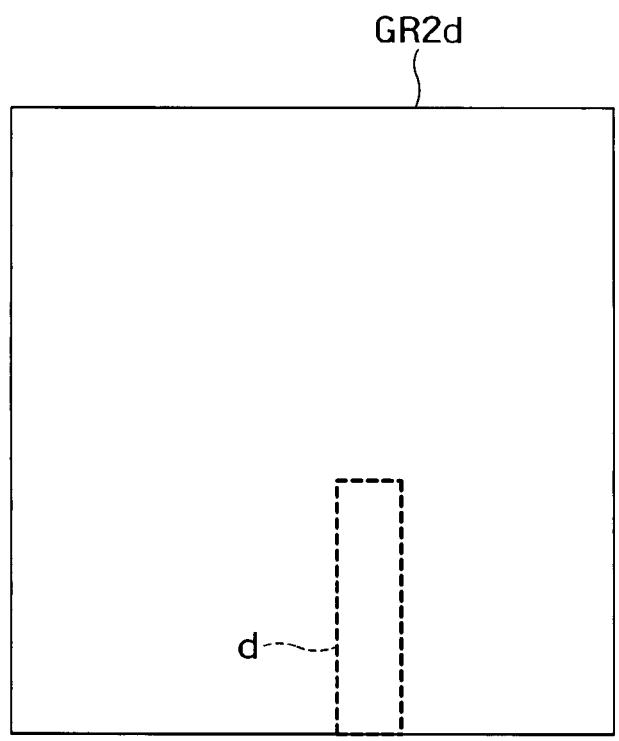
FIG. 14 is a diagram showing a part of the edge group extracted from the reference pattern within a reference image shown in FIG. 6.
Figure 15:
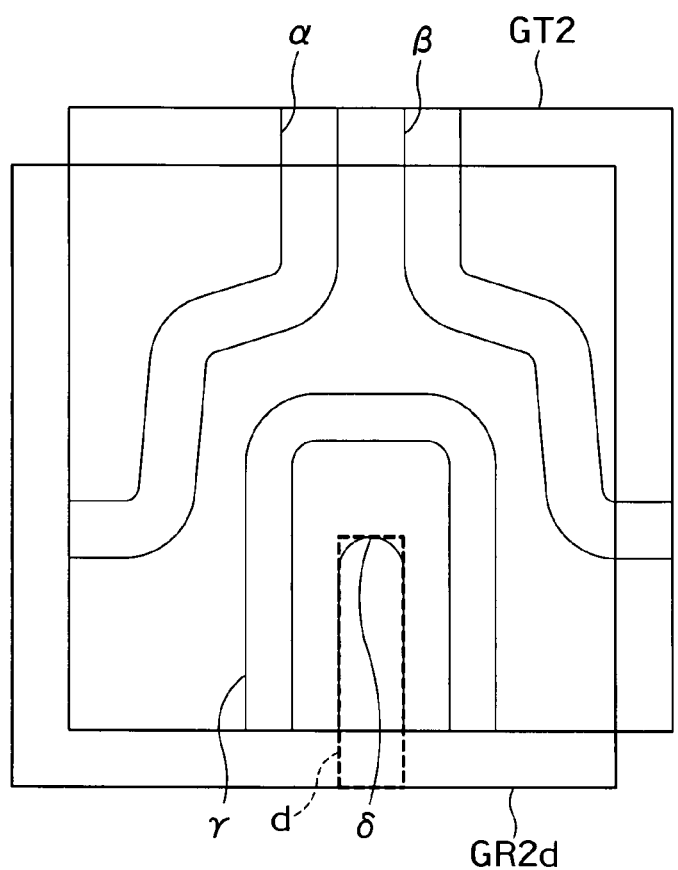
FIG. 15 is a diagram explaining one example of the alignment of the reference pattern edge group with an evaluation pattern edge group in the pattern shape evaluation method shown in FIG. 13.
Figure 16:
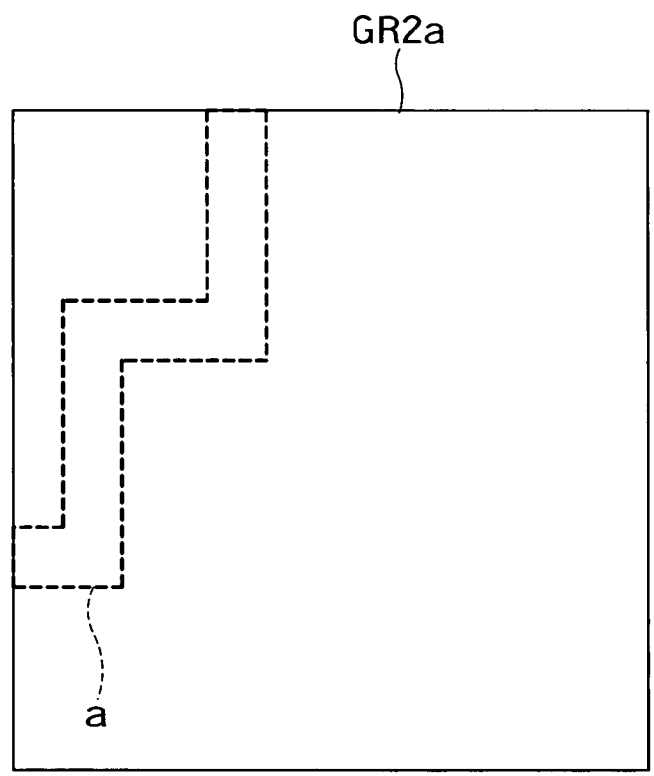
FIG. 16 is a diagram showing another part of the edge group extracted from the reference pattern within a reference image shown in FIG. 6.
Figure 17:
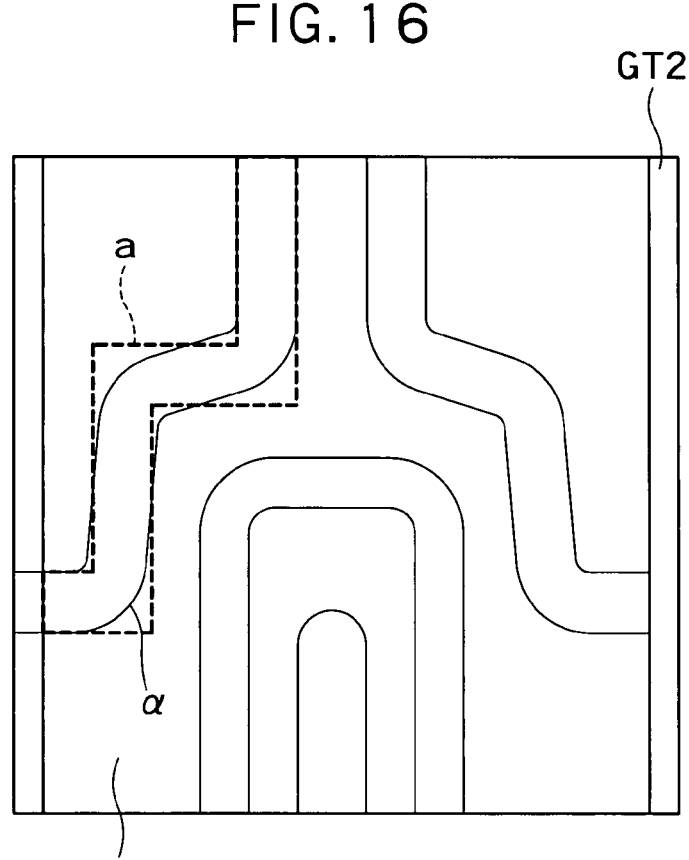
FIG. 17 is a diagram explaining another example of the alignment of the reference pattern edge group with the evaluation pattern edge group in the pattern shape evaluation method shown in FIG. 13.

Subsequently, the aligner 36 again aligns the associated edge groups with each other, and the positional difference amount calculator 38 calculates the positional difference amount for each case (step S29). A reference image GR2d shown in FIG. 14 shows the edge group d extracted from the reference pattern within the reference image GR2 shown in FIG. 6. When the reference pattern edge group "d" in FIG. 14 is only aligned with the edge group "δ" within the evaluation target pattern shown in FIG. 4, these are matched as shown in FIG. 15. Further, a reference image GR2a shown in FIG. 16 shows the edge group "a" extracted from the reference pattern within the reference image GR2. When this edge group "a" is only aligned with the edge group "α" within the evaluation target pattern shown in FIG. 4, these are matched as shown in FIG. 17. It is understood from a contrast between FIG. 15 and FIG. 17 that the positional difference amount in the matching of the edge group "d" with "δ" is obviously different from the positional difference amount in the matching of the edge group "a" with "α". The positional difference amount calculator 38 carries out such matching and calculation of the positional difference amounts for all of the edge groups, and the edge group selector 32 compares the positional difference amounts in the respective groups and detects whether there is an edge group whose positional difference amount is greater than those of the other groups (FIG. 13, step S30). To take an example of a specific method, a threshold value may be provided to a deviation obtained from an average value of the positional difference amounts of all the edge groups, so that an edge group exceeding this threshold value is determined as the edge group whose positional difference amount is relatively large.

Then, the reference pattern is again aligned with the evaluation target pattern except for the edge group whose positional difference amount is determined to be large (step S31), and the shape of the evaluation target pattern is evaluated as in the first embodiment described above (step S32).

Thus, according to the present embodiment, the positional difference amount is calculated between edge groups corresponding to each other, and the reference pattern is aligned with the evaluation target pattern except for the edge group whose positional difference amount is large, so that high-speed and highly accurate shape evaluation can be automatically achieved without depending on the level of the skills of the operator.

(4) Third Embodiment of Pattern Shape Evaluation Method

Figure 18:
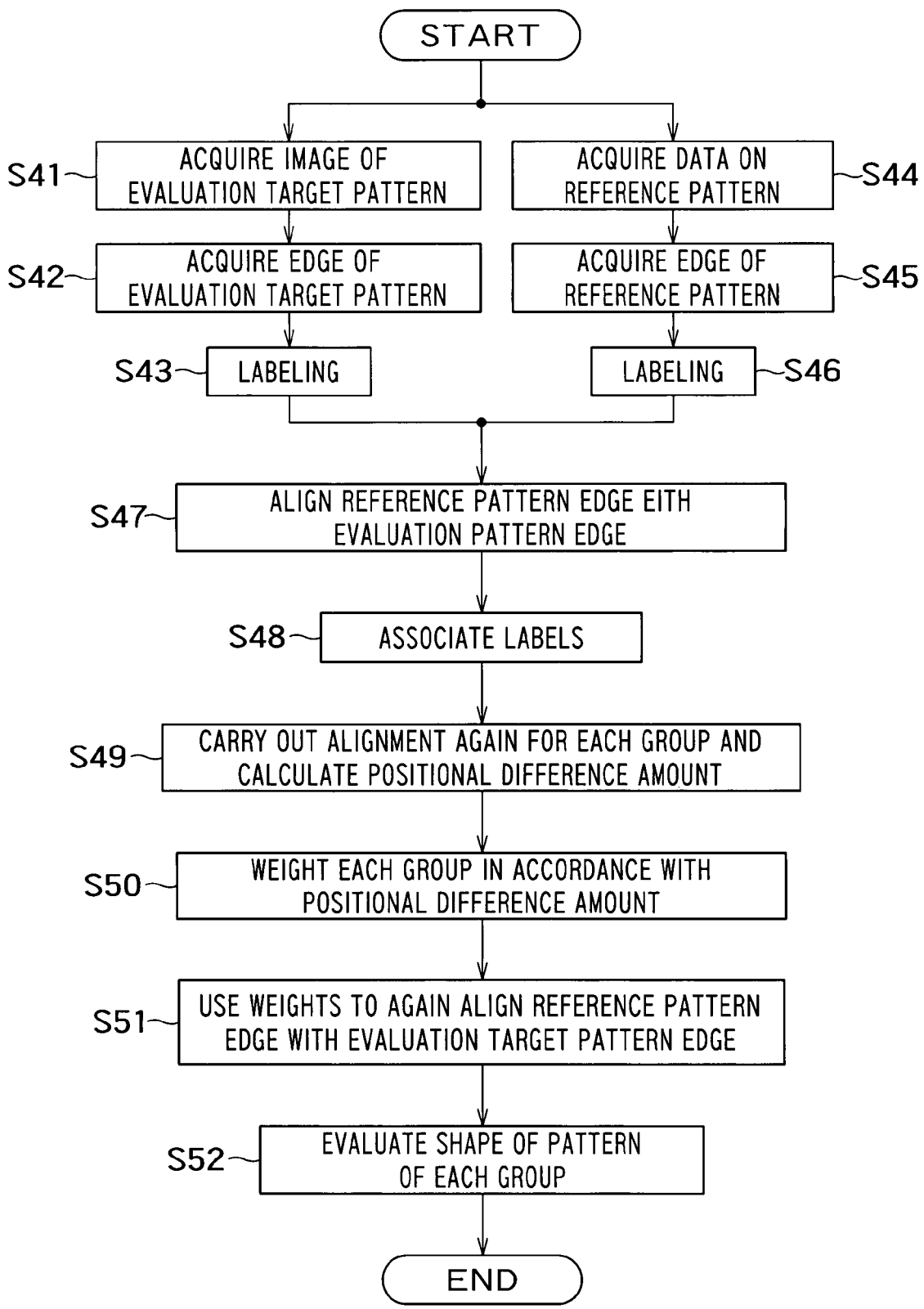
FIG. 18 is a flowchart showing a schematic procedure of a pattern shape evaluation method in a third embodiment according to the present invention.

FIG. 18 is a flowchart showing a schematic procedure of a pattern shape evaluation method in the present embodiment.

The present embodiment is characterized by the procedure shown in steps S50 and S51 in FIG. 18. For other steps in the procedure in FIG. 18, 20 is added to the numbers of the steps in the processing procedure in the third embodiment shown in FIG. 13, so that these steps are substantially the same. Therefore, the procedure shown in steps S50 and S51 in FIG. 18 will be described below.

That is, after completion of realignment and calculation of the positional difference amount (step S49), the weighting unit 42 of the matching unit 30 weights each edge group in accordance with the calculated positional difference amount (step S50). This weighting is set so that, for example, a deviation is obtained for each edge group from an average value of the positional difference amounts of all the edge groups and so that the weights are greater for the element patterns whose deviation is smaller. Using the weights thus given, the reference pattern edge group is again aligned with the evaluation target pattern edge group (step S51). Finally, the pattern shape is evaluated between the edge groups (step S52).

Thus, according to the present embodiment, each edge group is weighted in accordance with the positional difference amount, and it is thus possible to achieve the alignment free of the influence of the edge group having a large deviation of the positional difference amount. As a result, the accuracy of the pattern shape evaluation can be further increased.

(5) Fourth Embodiment of Pattern Shape Evaluation Method

Figure 19:
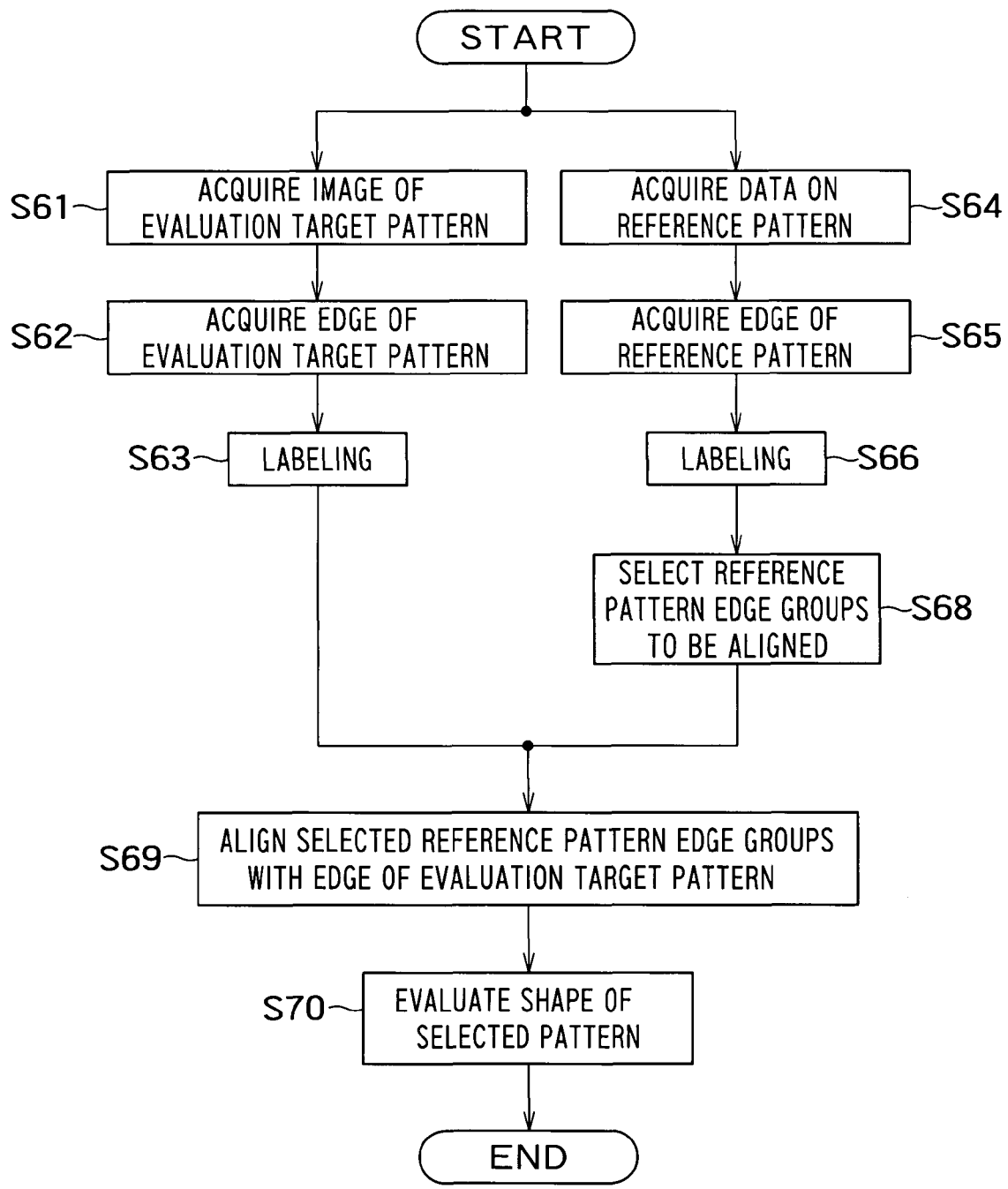
FIG. 19 is a flowchart showing a schematic procedure of a pattern shape evaluation method in a fourth embodiment according to the present invention.

While the reference pattern edge groups to be aligned are selected by a comparison between the evaluation target pattern edge groups and the reference pattern edge groups in the first embodiment described above, it is possible in some cases to experientially judge in advance by the reference pattern data alone that there is a high risk of decreasing the accuracy of alignment. For example, in the case of an isolated line pattern, it is possible to predict the occurrence of a significant positional difference at a particular end. In such a case, the reference pattern group judged to have a high risk of decreasing the accuracy of alignment is excluded without comparing the edge groups with each other as shown in step S7 in FIG. 2, such that the reference pattern edge groups to be aligned can be selected. A procedure of a pattern shape evaluation method according to such an embodiment is shown in a flowchart of FIG. 19. The difference between the procedure shown in FIG. 19 and the procedure in FIG. 2 is that there is no step in the procedure in FIG. 19 which corresponds to step S7 in FIG. 2, and that step S68 corresponding to step S8 in FIG. 2 is only inserted between step S66 and step S69 without using the result of labeling in step S63. For other steps in FIG. 19, 60 is added to the numbers of the steps in the procedure in FIG. 2, so that these steps are substantially the same as those in the procedure in FIG. 2.

(6) Program

A series of procedures of the pattern shape evaluation method in the embodiments described above may be incorporated in a program to be executed by a computer, stored as a recipe file in a recording medium such as a flexible disk or a CD-ROM, and read into and executed by the computer. This makes it possible to achieve the pattern shape evaluation method according to the present invention by use of a general-purpose control computer capable of image processing. The recording medium is not limited to a portable medium such as a magnetic disk or an optical disk, and may be a fixed recording medium such as a hard disk drive or a memory. Further, the program incorporating the series of procedures of the pattern shape evaluation method described above may be distributed via a communication line (including wireless communication) such as the Internet. Moreover, the program incorporating the series of procedures of the pattern shape evaluation method described above may be distributed in an encrypted, modulated or compressed state via a wired line such as the Internet or a wireless line or in a manner stored in a recording medium.

(7) Semiconductor Device Manufacturing Method

When the pattern shape evaluation method described above is used in a process of manufacturing a semiconductor device, the shape of a pattern can be evaluated with high accuracy and in a short time, such that the semiconductor device can be manufactured with higher yield and throughput.

More specifically, a semiconductor substrate is extracted per production lot, and a pattern formed on the extracted semiconductor substrate is evaluated by the pattern shape evaluation method described above. When the semiconductor substrate exceeds a threshold value set in accordance with the specifications of a product and is judged as a nondefective product as a result of the evaluation, the rest of the manufacturing process is continuously executed for the whole production lot to which the evaluated semiconductor substrate belongs. On the other hand, when the semiconductor substrate is judged as a defective product as a result of the evaluation and can be reworked, rework processing is executed for the production lot to which the semiconductor substrate judged as the defective product belongs. When the rework processing is finished, the semiconductor substrate is extracted from the production lot, and the shape of the pattern is again evaluated. If the extracted semiconductor substrate is judged as a nondefective product as a result of the reinspection, the rest of the manufacturing process is executed for the production lot finished with the rework processing. In addition, when the rework processing is impossible, the production lot to which the semiconductor substrate judged as the defective product belongs is disposed of. When the cause of the defect can be analyzed, results of the analysis are fed back to a person in charge of designing, a person in charge of an upstream process or the like.

While the embodiments of the present invention have been described above, the present invention is not limited to the embodiments described above, and can be modified in various manners within the technical scope thereof and carried out. For example, the design data is used to prepare the reference pattern in the embodiments described above, but the present invention is not limited thereto, and lithography simulation data may be used or an image taken from the actual pattern may be used.

What is claimed is:

1. A pattern shape evaluation method comprising causing a computer to perform operations of:
    acquiring an image of an evaluation target pattern including a plurality of element patterns;
    detecting an edge of the evaluation target pattern from the image;
    dividing the detected edge of the evaluation target pattern into a plurality of evaluation target pattern edge groups;
    acquiring an edge of a reference pattern serving as an evaluation standard for the element patterns;
    dividing the edge of the reference pattern into a plurality of reference pattern edge groups;
    selecting a reference pattern edge group to be aligned with the edge of the evaluation target pattern from the divided reference pattern edge groups;
    aligning the edge of the selected reference pattern edge group with the edge of the evaluation target pattern;
    evaluating the shape of the evaluation target pattern by use of the result of the alignment;
    carrying out a first alignment of the edges of all the divided reference pattern edge groups with the edges of all the divided evaluation target pattern edge groups;
    associating the edges of the reference pattern edge groups with the edges of the evaluation target pattern edge groups by use of the result of the first alignment; and
    calculating the amount of a positional difference between the edges of the reference pattern edge groups with the evaluation target pattern edge groups for each of the corresponding edge groups,
    wherein the reference pattern edge group is selected by excluding a reference pattern edge group of an element pattern that is more likely to decrease an accuracy in alignment between the evaluation target pattern and the reference pattern than other element patterns by use of the calculated amount of the positional difference and a preset threshold value, and
    the evaluation of the shape of the evaluation target pattern is carried out by use of the result of a realignment of the edge groups excluding the edge group in which the amount of the positional difference is relatively large.

2. The pattern shape evaluation method according to claim 1, further comprising:
    weighting each of the reference pattern edge groups,
    wherein the alignment is carried out by use of the weighting.

3. The pattern shape evaluation method according to claim 1, further comprising:
    associating the edges of the reference pattern edge groups with the edges of the evaluation target pattern edge groups by use of the result of the alignment,
    wherein the shape evaluation is carried out for the evaluation target pattern edge group corresponding to the reference pattern edge group which has not been selected for the alignment.

4. The pattern shape evaluation method according to claim 1, wherein calculating the amount of the positional difference for each of the corresponding edge groups comprises:
    calculating an average value of the positional difference amounts of all the edge groups; and
    calculating a deviation from the average value for each edge group,
    wherein the selection of the reference pattern edge group comprises:
    comparing the deviation of each edge group with the threshold value; and
    prescribing the edge group whose deviation exceeds the threshold value as the edge group of an element pattern that is more likely to decrease an accuracy in alignment between the evaluation target pattern and the reference pattern than the other element patterns.

5. A non-transitory computer-readable recording medium containing a program which causes a computer to execute a pattern shape evaluation, the pattern shape evaluation comprising:
    acquiring an image of an evaluation target pattern including a plurality of element patterns;
    detecting an edge of the evaluation target pattern from the image;
    dividing the detected edge of the evaluation target pattern into a plurality of evaluation target pattern edge groups;
    acquiring an edge of a reference pattern serving as an evaluation standard for the element patterns;
    dividing the edge of the reference pattern into a plurality of reference pattern edge groups;
    selecting a reference pattern edge group to be aligned with the edge of the evaluation target pattern from the divided reference pattern edge groups;
    aligning the edge of the selected reference pattern edge group with the edge of the evaluation target pattern; and
    evaluating the shape of the evaluation target pattern by use of the result of the alignment,
    wherein the pattern shape evaluation further comprises:
    carrying out a first alignment of the edges of all the divided reference pattern edge groups with the edges of all the divided evaluation target pattern edge groups;
    associating the edges of the reference pattern edge groups with the edges of the evaluation target pattern edge groups by use of the result of the first alignment; and
    calculating the amount of a positional difference between the edges of the reference pattern edge groups with the evaluation target pattern edge groups for each of the corresponding edge groups,
    wherein the reference pattern edge group is selected by excluding a reference pattern edge group of an element pattern that is more likely to decrease an accuracy in alignment between the evaluation target pattern and the reference pattern than other element patterns by use of the calculated amount of the positional difference and a preset threshold value, and the evaluation of the shape of the evaluation target pattern is carried out by use of the result of a realignment of the edge groups excluding the edge group in which the amount of the positional difference is relatively large.

6. The medium according to claim 5,
wherein the pattern shape evaluation further comprises:
weighting each of the reference pattern edge groups,
wherein the alignment is carried out by use of the weighting.

7. The medium according to claim 5,
wherein the pattern shape evaluation further comprises:
associating the edges of the reference pattern edge groups with the edges of the evaluation target pattern edge groups by use of the result of the alignment,
wherein the shape evaluation is carried out for the evaluation target pattern edge group corresponding to the reference pattern edge group which has not been selected for the alignment.

8. A semiconductor device manufacturing method comprising executing a process of manufacturing a semiconductor device on a substrate when a pattern to be inspected formed on the substrate for a semiconductor device is judged to satisfy required specifications of the semiconductor device as a result of an evaluation by a pattern shape evaluation, the pattern shape evaluation comprising causing a computer to perform operations of:
acquiring an image of an evaluation target pattern including a plurality of element patterns;
detecting an edge of the evaluation target pattern from the image;
dividing the detected edge of the evaluation target pattern into a plurality of evaluation target pattern edge groups;
acquiring an edge of a reference pattern serving as an evaluation standard for the element patterns;
dividing the edge of the reference pattern into a plurality of reference pattern edge groups;
selecting a reference pattern edge group to be aligned with the edge of the evaluation target pattern from the divided reference pattern edge groups;
aligning the edge of the selected reference pattern edge group with the edge of the evaluation target pattern; and
evaluating the shape of the evaluation target pattern by use of the result of the alignment;
wherein the pattern shape evaluation further comprises:
carrying out a first alignment of the edges of all the divided reference pattern edge groups with the edges of all the divided evaluation target pattern edge groups;
associating the edges of the reference pattern edge groups with the edges of the evaluation target pattern edge groups by use of the result of the first alignment; and
calculating the amount of a positional difference between the edges of the reference pattern edge groups with the evaluation target pattern edge groups for each of the corresponding edge groups,
wherein the reference pattern edge group is selected by excluding a reference pattern edge group of an element pattern that is more likely to decrease an accuracy in alignment between the evaluation target pattern and the reference pattern than other element patterns by use of the calculated amount of the positional difference and a preset threshold value, and
the evaluation of the shape of the evaluation target pattern is carried out by use of the result of a realignment of the edge groups excluding the edge group in which the amount of the positional difference is relatively large.

9. The semiconductor device manufacturing method according to claim 8,
wherein the pattern shape evaluation further comprises causing the computer to perform operations of:
weighting each of the reference pattern edge groups,
wherein the alignment is carried out by use of the weighting.

10. The semiconductor device manufacturing method according to claim 8,
wherein the pattern shape evaluation further comprises causing the computer to perform an operation of associating the edges of the reference pattern edge groups with the edges of the evaluation target pattern edge groups by use of the result of the alignment,
wherein the shape evaluation is carried out for the evaluation target pattern edge group corresponding to the reference pattern edge group which has not been selected for the alignment.

11. A pattern shape evaluation apparatus comprising:
a tangible storage medium for storing an image of an evaluation target pattern including a plurality of element patterns;
an edge detecting unit which detects the edge of the evaluation target pattern from the stored image;
an edge labeling unit which divides the edge of the detected evaluation target pattern into a plurality of evaluation target pattern edge groups;
a design data labeling unit which is provided with data on the edge of a reference pattern serving as an evaluation standard for the element patterns and which divides the edge of the reference pattern into a plurality of reference pattern edge groups;
a selecting unit which selects a reference pattern edge group to be aligned with the edge of the evaluation target pattern from the divided reference pattern edge groups;
an alignment unit which aligns the edge of the selected reference pattern edge group with the edge of the evaluation target pattern; and
a pattern shape evaluation unit which evaluates the shape of the evaluation target pattern by use of the result of the alignment, wherein
the alignment unit carries out a first alignment of the edges of all the divided reference pattern edge groups with the edges of all the divided evaluation target pattern edge groups, and
the pattern shape evaluation apparatus further comprising:
a group association unit which associates the edges of the reference pattern edge groups with the edges of the evaluation target pattern edge groups by use of the result of the first alignment; and
a positional difference amount calculating unit which calculates the amount of a positional difference between the edge of the reference pattern edge group with the evaluation target pattern edge groups for each of the corresponding edge groups,
the selecting unit selecting the reference pattern edge group to be aligned by excluding a reference pattern edge group of an element pattern that is more likely to decrease an accuracy in alignment between the evaluation target pattern and the reference pattern than other element patterns by use of the calculated amount of the positional difference and a preset threshold value,
the alignment unit carrying out a realignment of the edge groups excluding the edge group in which the amount of the positional difference is relatively large, the pattern shape evaluation unit evaluating the shape of the evaluation target pattern by use of the result of the realignment.

12. The pattern shape evaluation apparatus according to claim 11, further comprising:
a weighting unit which weights each of the reference pattern edge groups,
wherein the alignment unit carries out the alignment by use of the weighting.

13. The pattern shape evaluation apparatus according to claim 11, further comprising:
a group associating unit which associates the edges of the reference pattern edge groups with the edges of the evaluation target pattern edge groups by use of the result of the alignment,
wherein the pattern shape evaluation unit carries out the shape evaluation for the edge group of the evaluation target pattern corresponding to the reference pattern edge group which has not been selected for the alignment.

14. The pattern shape evaluation apparatus according to claim 11, wherein
the positional difference amount calculating unit calculates an average value of the positional difference amounts of all the edge groups, calculates a deviation from the average value for each edge group, compares the deviation of each edge group with a preset threshold value, and prescribes the edge group whose deviation exceeds the threshold value as the edge group of an element pattern that is more likely to decrease an accuracy in alignment between the evaluation target pattern and the reference pattern than the other element patterns.

* * * * *